United States Patent

Horii et al.

[11] Patent Number: 6,124,859
[45] Date of Patent: *Sep. 26, 2000

[54] PICTURE CONVERSION METHOD AND MEDIUM USED THEREFOR

[75] Inventors: Youichi Horii, Boulogne-Billancourt, France; Kiyoshi Arai, Kokunbunji, Japan

[73] Assignee: Hitachi, Ltd., Tokyo, Japan

[*] Notice: This patent is subject to a terminal disclaimer.

[21] Appl. No.: 08/904,449

[22] Filed: Jul. 31, 1997

[30] Foreign Application Priority Data

Jul. 31, 1996 [JP] Japan .................................. 8-201532

[51] Int. Cl.$^7$ .................................................. G06T 15/10
[52] U.S. Cl. .......................................... 345/427; 345/425
[58] Field of Search .................................. 345/425, 427, 345/433; 382/295, 285, 311

[56] References Cited

U.S. PATENT DOCUMENTS 5,870,099  2/1999  Horii et al. ............................. 345/427

OTHER PUBLICATIONS

Design Compilation CG Standard Text Book, Committee of Design Compilation—CG Standard Text Book, CG–Arts Society, Japan (1996), pp. 88 to 90.

James D. Foley, et al. Computer Graphics Principles and Practice. Section 6.5 Implementing Planar geometric Projections. pp 258–279, 1990.

Primary Examiner—Mark Zimmerman
Assistant Examiner—Philip H. Stevenson
Attorney, Agent, or Firm—Antonelli, Terry, Stout & Kraus, LLP

[57] ABSTRACT

Auxiliary figures superscribed on an original picture displayed on a display are moved and deformed conforming to a clue of a perspective view of an original picture so as to obtain a vanishing point automatically, and three-dimensional information of the original picture is estimated. Further, a camera angle is set up by moving and deforming an auxiliary figure for setting up three-dimensional information, and a picture at that camera angle is formed.

It is possible to convert an original picture into a picture seen from a desired camera angle easily. It becomes possible, when a three-dimensional picture is formed, to convert a two-dimensional picture into a picture seen from another visual point on a computer without requiring a picture from the front and while maintaining the resolution of the perspective view as is with the perspective view as an original picture.

8 Claims, 10 Drawing Sheets

(a) GUIDE FIGURE D

- 179, 176
- 180 RECTANGLE REGION R
- 181
- 178, 177
- 175 VANISHING POINT VP (b) TRANSFORMATION OF RECTANGLE REGION R (c) MOVEMENT RECTANGLE REGION R (d) MOVEMENT OF 176

(e) MOVEMENT OF VANISHING POINT VP (a) ROTATION FOR ALL DIRECTION (b) MOVEMENT FOR ALL DIRECTION (c) MOVEMENT TO THE FRONT AND THE REAR (d) FIELD OF VIEW ANGLE

| | | |
|---|---|---|
| CAMERA ANGLE | Cs.Ex,Cs.Ey,Cs.Ez,Cs.Lx,Cs.Ly,Cs.Lz,Cs.Ea | 710 |
| CAMERA ANGLE AFTER CONVERSION | Cd.Ex,Cd.Ey,Cd.Ez,Cd.Lx,Cd.Ly,Cd.Lz,Cd.Ea | 720 |
| TRAPEZOID | Ts[i][j].h,Ts[i][j].v,Ts[i][j].x,Ts[i][j].y,Ts[i][j].z | 730 |
| TRAPEZOID AFTER CONVERSION | Td[i][j].h,Td[i][j].v,Td[i][j].x,Td[i][j].y,Td[i][j].z | 740 |
| ORIGINAL PICTURE | R,G,B,R,G,B,R,G,B, ··· | 750 |
| VANISHING POINT | VP.h,VP.v | 760 |
| RECTANGLE REGION | R.h,R.v,R.dh,R.dv | 770 | i : 0,1,2,3,4    J : 0,1,2,3

PICTURE CONVERSION METHOD AND MEDIUM USED THEREFOR

BACKGROUND OF THE INVENTION

The present invention relates to a method of aiding picture editing using a computer, and more particularly to a method suitable for forming a three-dimensional picture seen from a free visual point based on a two-dimensional picture.

Conventionally, there has been a texture mapping method utilizing perspective projection as an example of forming a three-dimensional picture using a method of composing pictures of a perspective view. The method will be explained more specifically with reference to FIG. 10. The three-dimensional space is regarded as a hexahedron, and a case that a visual point exists within the hexahedron is taken as an example. A three-dimensional model composed of five faces ("a" to "e") at an angle reflected in the field of view is prepared (1000 in FIG. 10). Two-dimensional front pictures corresponding to the faces "a" to "e", respectively, are prepared, and the pictures are stuck to the faces by the texture mapping method. Then, when the faces "a" to "e" are recomposed and a three-dimensional model is restored, desired three-dimensional computer graphics are completed.

This method is realized by means of some three-dimensional computer graphics software, and is discussed in the Design Compilation CG Standard Text Book Committee of Design Compilation-CG Standard Text Book, CG-Arts Society, Japan (1996), pp. 88 to 90.

Besides, the perspective projection is draftsmanship of drawing a three-dimensional configuration on a two-dimensional plane while expressing a feeling of distance by setting a vanishing point and drawing a figure based on this vanishing point. When a picture is drawn on a two-dimensional plane in the field of computer graphics, the perspective projection described above is also used in order to express a feeling of distance in the drawn picture.

In the method of composing pictures of a perspective view by the texture mapping method described above, it has been most desirable that texture pictures to be stuck on the face are photographed or drawn from the front. However, there are cases where it is difficult to obtain a picture seen from the front. For example, when the faces "a" to "e" of the front picture in FIG. 10 is obtained by photographing with a camera, the distances between the planes of the surfaces of the wall, the floor and the ceiling and the camera are different. Thus, it is difficult to take photographs of faces in a wide range from the front.

Further, because of the restriction in the amount of memory contained in the computer, the resolution of the texture picture being taken is low, and it is difficult to raise the resolution of the recomposed perspective view.

SUMMARY OF THE INVENTION

It is an object of the present invention to provide a method apparatus and computer program of forming a three-dimensional picture from one two-dimensional picture having a feeling of distance.

It is another object of the present invention to provide a method apparatus and computer program of converting a two-dimensional picture into a picture seen from another visual point on a computer without requiring a picture from the front and while maintaining the resolution of an original picture as it is.

In order to achieve the above-mentioned objects, according to the present invention, a vanishing point and a dead end region of depth of an original picture are set up in a vanishing point set up routine. The three-dimensional configuration of the picture is estimated in a three-dimension estimation routine. A camera angle different from that of an original picture is set up in a camera angle set up routine. In a conversion picture formation routine, a conversion picture at a camera angle newly set up by a user is formed.

By converting into data such as postscript, it is possible to insert the data into an optional two-dimensional picture editing software and an optional text editing software. Further, it may also be arranged so as to insert three-dimensional configuration data and camera angle into optional three-dimensional CAD data.

According to the present invention, it is possible to convert the original picture into a picture seen from an altered camera angle by using a guide figure to have the figure coincide with a portion which becomes a clue of a perspective view of an original picture, setting up a vanishing point and a dead end region of the depth and altering a camera angle. Accordingly, the picture from the front is not required, and it becomes possible to convert a two-dimensional picture into a picture seen from another visual point on a computer by means of simple operation while maintaining the resolution of the original picture as it is.

Still further advantages of the present invention will become apparent to those of ordinarily skill in the art upon reading and understanding the following detailed description of the preferred and alternate embodiments.

BRIEF DESCRIPTION OF THE DRAWINGS

The invention will be described in conjunction with certain drawings which are for the purpose of illustrating the preferred and alternate embodiments of the invention only, and not for the purpose of limiting the same, and wherein.

DESCRIPTION OF THE PREFERRED EMBODIMENTS

The embodiments of the present invention will be explained hereinafter with reference to the drawings.

Embodiment 1

[1] System Structure

Figure 1A:
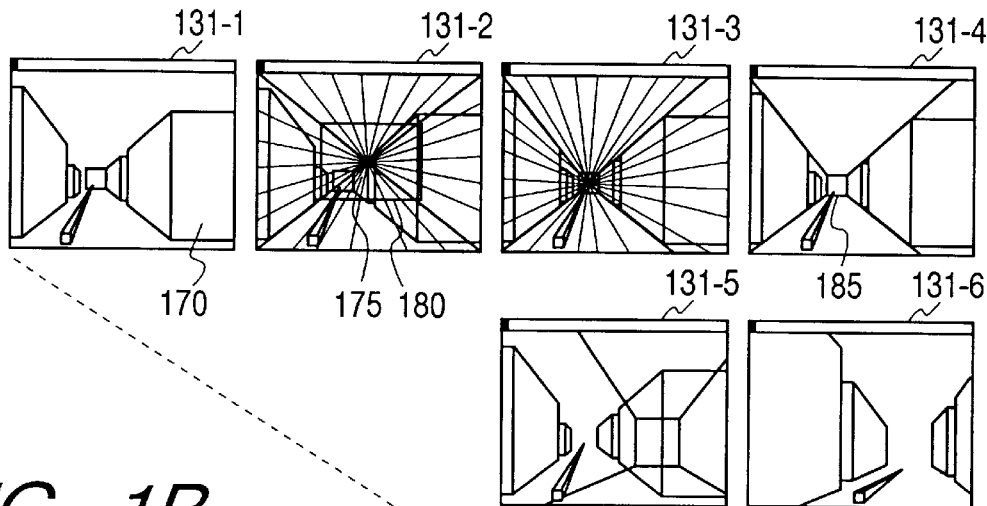
FIGS. 1A and 1B are diagrams showing a picture conversion system of an embodiment and operation of an original picture and auxiliary figures shown on a display.
Figure 1B:
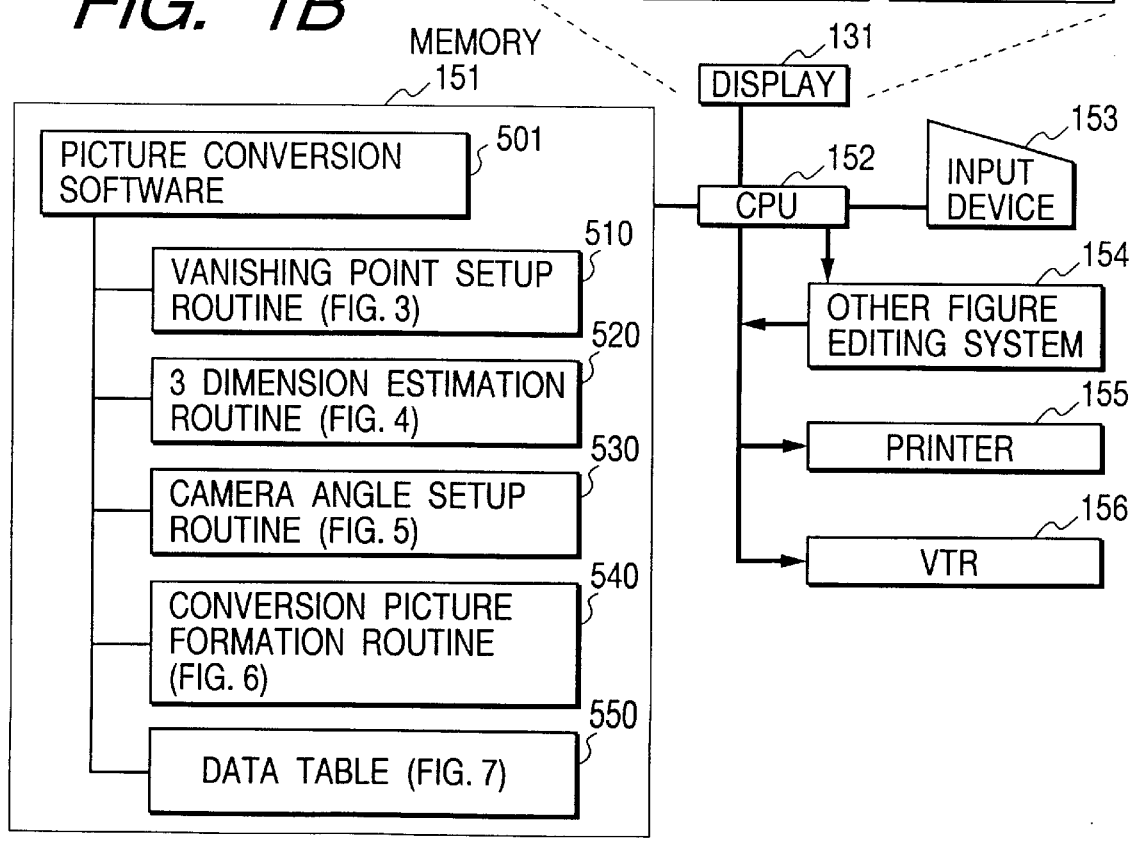

FIGS. 1A and 1B show an example of a picture conversion system used for executing a method computer program of forming a three-dimensional picture according to the present invention.

Diagrams 131–1 to 131–6 show planes of projection of projection views displayed on a display of the present system. A picture conversion software 501 applied with a picture conversion method of the present invention is held in a memory 151 connected to a central processor unit 152. The picture conversion software 501 activates a vanishing point set up routine 510 after displaying an original picture A (170) on a display 131–1, and moves and deforms (131–2 to 131–3) auxiliary figures D(175 and 180) conforming to a clue of the projection view of the original picture in accordance with a user input from an input device 153. Next, a three-dimension estimation routine 520 is activated and three-dimensional information of the original picture A is estimated and stored in a data table 550. A camera angle set up routine 530 is activated, and the camera angle is set up (131–4 to 131–5) and stored in the data table 550 by moving and deforming an auxiliary figure E(185) of the three-dimensional information in accordance with the user input from the input device 153. Then, a conversion picture formation routine 540 is activated and a picture according to the camera angle is formed(131–6). The vanishing point set up routine 510, the three-dimension estimation routine 520, the camera angle set up routine 530, the conversion picture formation routine 540 and the data table 550 will be described in detail later.

After being sent to other figure editing system 154 as two-dimensional or three-dimensional figure data, the data of the formed perspective view are either inputted to a printer 155 to be printed on paper or inputted to a VTR device 156 to become video software as occasion demands. The other figure editing system 154 may be, a system using a two-dimensional figure editing software, a sentence editing software, a three-dimensional CAD software and so on.

[2] Flow of Processing

Figure 2:
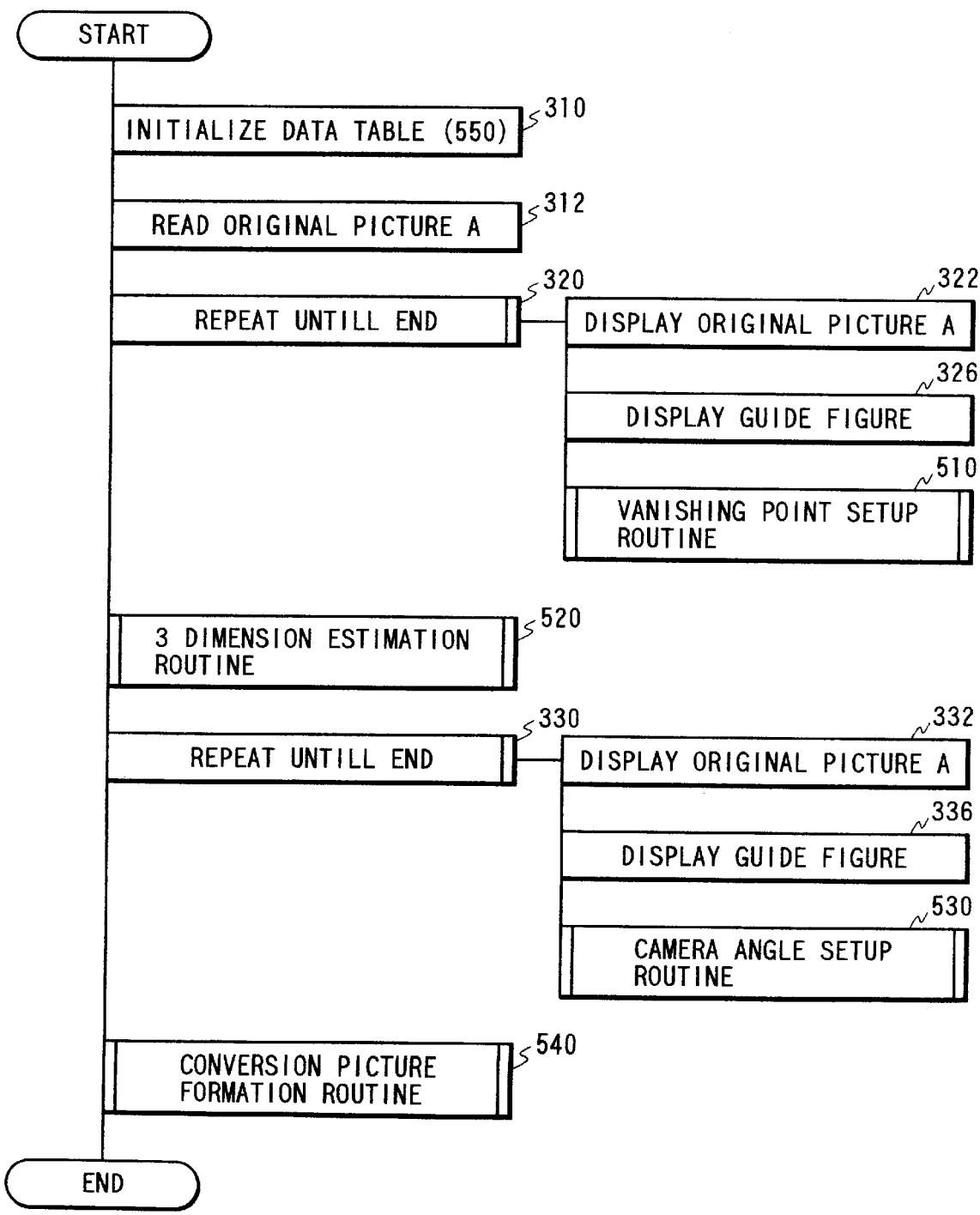
FIG. 2 is a diagram showing a flow of processing in an embodiment 1.

A flow of the whole picture conversion processing of the present embodiment will be described with reference to the picture plane display examples (131–1 to 131–6) shown in FIG. 1A and the PAD diagram shown in FIG. 2.

It is assumed that starting of the picture conversion software 501 in the memory 151 is the start of the PAD diagram.

First, the data table 550 in the memory 151 is initialized (step 310). The details of the data table 550 will be described later.

Next, a two-dimensional original picture A to be converted into a three-dimensional picture is read, and colors of all picture elements are stored in the data table (step 312).

The vanishing point set up routine 510 is executed. The vanishing point set up routine 510 is to include, in a broad sense, not only processing to set up the vanishing point, but also a step 322 for displaying an original picture A on a display 131 and a step 326 for displaying an auxiliary figure D (guide figure) used for setting up the vanishing point on the original picture. The display of the original picture A (170 shown in FIG. 1A) is shown at 131–1 in FIG. 1A. The auxiliary figure D used for setting up the vanishing point is composed of radial lines 175 and a rectangle 180 shown in FIG. 1A.

An initial state in which the auxiliary figure D is superscribed is shown at 131–2 of FIG. 1A. In the vanishing point set up routine, the auxiliary figure D is moved and deformed by means of instruction input from the exterior such as a pointing device (not shown) like a mouse and a keyboard. To be concrete, a region which is regarded as the dead end of the depth when the picture is regarded as a three-dimensional picture in point of expression of a perspective view of the original picture A is designated by a rectangle 180, and the vanishing point is set up by a starting point of radial segment of a line. The central processing unit 152 updates the data table 550 on the basis of these dead end region and vanishing point. The steps 322, 326 and 510 are repeated until appropriate dead end region and vanishing point are set up by a user (step 320).

The three-dimensional configuration of the to original picture A is obtained from the updated data table 550 (step 520).

A camera angle different from that of the original picture A is set up. The original picture A and an auxiliary figure E used for setting up a camera angle are displayed in place of the auxiliary figure D used when a vanishing point is set up in the step 320 (step 332 and step 336). Here, the camera angle may be, a three-dimensional vector showing three-dimensional coordinates of a visual point and direction of a line of sight and an angle of view. An initial picture displaying the original picture A and the auxiliary figure E is shown at 131–4 in FIG. 1A. An initial value (185 in FIG. 1A) of the auxiliary figure E has been deemed to be a boundary line of planes forming the three-dimensional configuration set up by the three-dimension estimation routine 520 in the present embodiment, however, which is not specified thereto. In the camera angle set up routine 530, the auxiliary figure E is also moved by an external instruction from a pointing device (not shown) such as a mouse and a keyboard. The camera is rotated up and down and left and right, and moved up and down, left and right and in front and in the rear by moving the auxiliary figure E, thereby to increase or decrease the angle of view. A picture plane example in which the camera angle is altered from the initial value by the auxiliary figure E is shown at 131–5 in FIG. 1A. The data table 550 is updated in accordance with a newly set up camera angle position. In the camera angle set up routine, the data table 550 updated by the camera angle set up routine is referred to, a conversion picture by the camera angle set up by a user is formed and displayed on a display 131 (step 540). When the camera angle is set up at 131–5 in FIG. 1A, a display example of executing the conversion picture formation routine 540 is shown at 131–6 in FIG. 1A.

Next, a principal routine of the picture conversion software 501 will be explained in sequence.

[3] Vanishing Point Set Up Routine

The vanishing point set up routine 510 will be explained with reference to FIGS. 3(*a*) to 3(*e*). In the vanishing point set up routine, the auxiliary figure D is moved and deformed conforming to the clue of the perspective view of the original picture A in accordance with a user input from the input device 153, thereby to determine a vanishing point VP and a rectangular region R of the dead end of the depth of the original picture A from 175 and 180, respectively.

Figure 3:
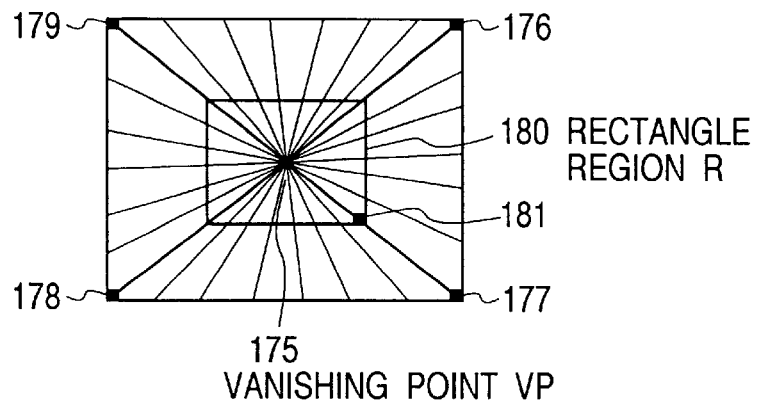
FIGS. 3(*a*) to 3(*e*) are diagrams showing a method of operating a vanishing point set up routine of the embodiment 1.
Figure 3:
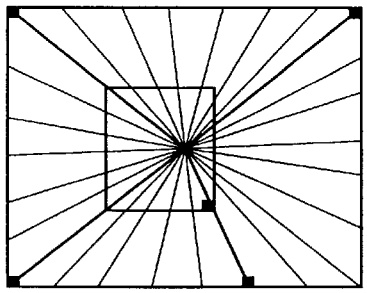
Figure 3:
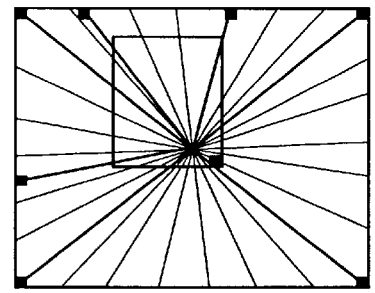
Figure 3:
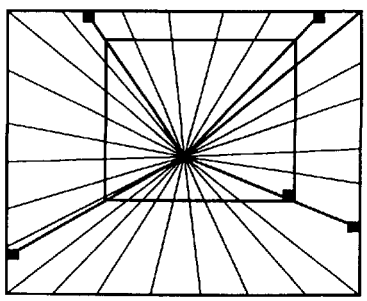
Figure 3:
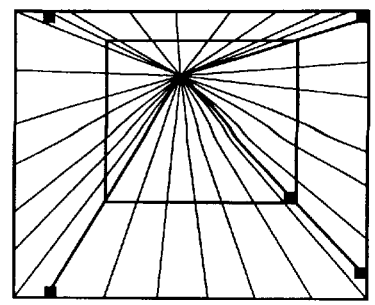

An initialized auxiliary figure D before movement and deformation is shown in FIG. 3(*a*). FIG. 3(*a*) corresponds to the auxiliary figure D shown at 131–2 in FIG. 1A. The initialized auxiliary figure D, in which a central point of the displayed original picture A is assumed to be the vanishing point VP 175, and is composed of a rectangular region R 180 arranged optionally at the center, a vanishing point 175 and segments of a line arranged radially in a predetermined direction from the vanishing point 175. The arranged segments of a line are provided for the purpose of making it easy to set up the vanishing point. Further, the distribution thereof is composed of segments of lines connecting the vanishing point 175 with four corners 176 to 179 of the original picture (viz., four apexes of a picture region or a window region displaying the original picture), and segments of lines connecting positions obtained by dividing four sides top and bottom and left and right of the original picture (viz., four sides of the picture plane region and the window region displaying the original picture) with the vanishing point. The segments connecting the vanishing point 175 with four corners of 176 to 179 pass through four apexes of the rectangular region 180.

Coordinates of the vanishing point 175 in horizontal and vertical directions are assumed to be VP.h and VP.v, respectively. The horizontal and vertical coordinates of the upper left apex of the rectangular region R are referred to as R.h and R.v, and the lengths in horizontal and vertical directions of the boundary line of the rectangular region R are referred to as R.dh and R.dv. 176, 177, 178 and 179 show points where half lines which have been drawn from the vanishing point 175 toward respective apexes of the rectangular region R intersect with top and bottom and to left and right four sides of the original picture A.

FIGS. 3(*b*),(*c*),(*d*) and (*e*) are reformed guide figures (auxiliary figures) when rectangle region 180 is re-sized, when rectangle region 180 is moved, when cross point 176 is moved, and when vanishing point 175 is moved respectively. In FIGS. 3(*b*),(*c*),(*d*) and (*e*), numbers 176*i*–178*i*, 181*i*(i=b,c,d or e) corresponds to numbers 176–178, 181 in FIGS. 3(*a*) respectively.

Next, an example of a method of setting up the vanishing point VP and the rectangular region R of the original picture A by moving and deforming the above-mentioned auxiliary figure D conforming to the clue of the perspective view of the original picture A will be described. The rectangular region R is moved to a region which can be regarded as the depth region of the perspective view of the original picture A and is deformed there. The segments of a line connecting the vanishing point 175 with four apexes of the rectangular region R are moved to the position of the boundary line of left and right and upper and lower planes when the original picture is regarded as a three-dimensional space.

In the present embodiment, a pointing device such as a mouse provided with at least one button is used as the input device 153 for instructing movement and deformation of the auxiliary figure D. Respective processings are performed depending on the cases that the position of the cursor when the button of the pointing device is pushed is located (1) within the rectangular region R (180), (2) in the vicinity of 176 to 179 and (3) other than the above. The numbers corresponding to the numbers in FIG. 3(*a*) are shown by the similar numbers, number with each of alphabet of b to e.

(1) When the position of the cursor is in the vicinity of the rectangular region R (180)

When the position of the cursor is located in the vicinity of the right lower corner of the rectangular region R 181, the horizontal and vertical lengths R.dh and R.dv of the rectangular region R are updated so that the position when the button of the pointing device is released becomes a new right lower apex. FIG. 3(*b*) shows an example in which the position of the apex 181 is altered from the state shown in FIG. 3(*a*) and the rectangular region R is deformed, and the positions of the radial segments of a line have been altered with the deformation. Further, when the button is-pushed, the position of the cursor is not located in the vicinity of the right lower corner of the rectangular region R, the rectangular region R is moved so as to update R.h and R.v as shown in FIG. 3(*c*). FIG. 3(*c*) shows an example in which the state has been altered from the state shown in FIG. 3(*b*).

(2) When the position of the cursor is in the vicinity of 176 to 179

When the position of the cursor is in the vicinity of 176 to 179, respective points are moved. At this time, opposite points are also updated. When a point corresponding to 176 shown right above in FIG. 3(*a*) is moved to the right in FIG. 3(*c*), the rectangular region R is deformed, and the position of a point opposite to 176 (a point corresponding to the apex 178 in FIG. 3(*c*)) is also moved with the deformation. FIG. 3(*d*) shows an example that the point 176 has been moved from the state shown in FIG. 3(*a*).

(3) The other cases

When the position of the cursor is neither of the cases (1) when the position of the cursor is in the vicinity of the rectangular region R (180) and (2) when the position of the cursor is in the vicinity of 176 to 179, the vanishing point VP is moved and VP.h and VP.v are updated. With the movement of the vanishing point, the points corresponding to apexes 176 to 179 in FIG. 3(*a*) are altered to the positions where the extension of the segments of a line connecting the vanishing point with respective apexes of the rectangular region intersect with the boundary line of the display region of the picture. FIG. 3(*e*) shows an example in which the position of the vanishing point has been altered from the state shown in FIG. 3(*d*).

Through the processing described above, the vanishing point VP and the rectangular region R of the dead end of the depth of the original picture A are set up (131–3 in FIG. 1A) using the auxiliary figure D, and are stored in the data table.

[4] Three-Dimension Estimation Routine

Figure 4:
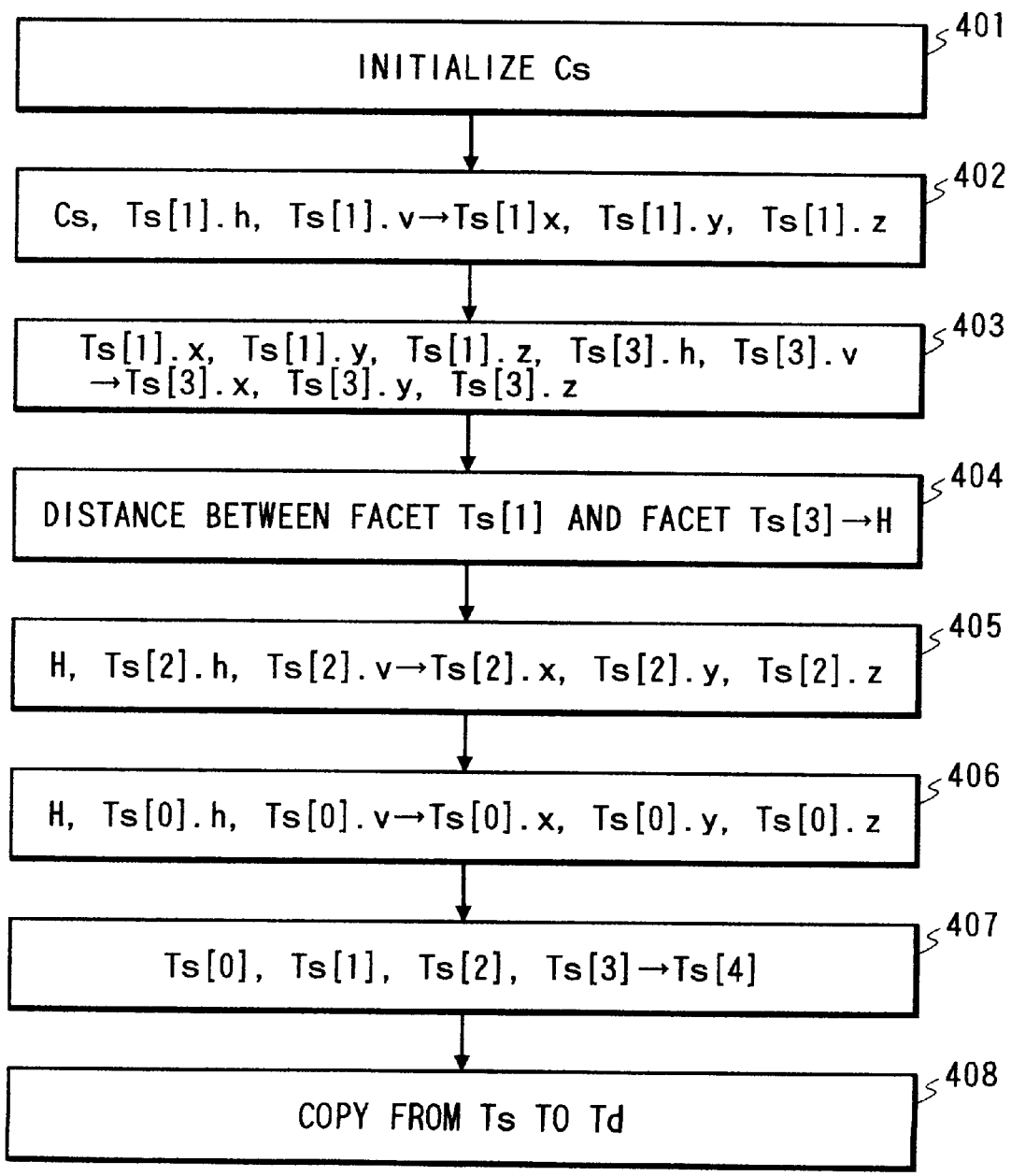
FIG. 4 is a diagram showing a three-dimension estimation routine of the embodiment 1.

The three-dimension estimation routine 520 will be described with reference to FIG. 4. Ts shows a structure of two-dimensional (h, v) and three-dimensional coordinates (x, y, z) showing three-dimensional right wall Ts[0], floor Ts[1], left wall Ts[2], ceiling Ts[3] and depth wall Ts[4].

First, an initial camera angle Cs is initialized in 401. In 402, the three-dimensional coordinates of Ts[1] are obtained from such conditions that the two-dimensional coordinates of Ts[1] and camera angle is Cs in the three-dimensional coordinates, and Ts[1] are on a y=0 plane in the three-dimensional space.

In 403, three-dimensional coordinates of Ts[3] are obtained from the three-dimensional coordinates of Ts[1], the two-dimensional coordinates of Ts[3] an initial camera angle CS, all adjacent walls are orthogonal and such conditions that Ts[1] and Ts[3] are parallel to each other. In 404, the distance between Ts[1] and Ts[3] is substituted for H. In 405, the three-dimensional coordinates of Ts[2] are obtained from H and the two-dimensional coordinates of Ts[2]. In 406, the three-dimensional coordinates of Ts[0] are obtained from H and the two-dimensional coordinates of Ts[0]. In 407, the three-dimensional coordinates of Ts[4] are obtained from the three-dimensional coordinates of Ts[0], Ts[1], Ts[2] and Ts[3]. In 408, all of the values of Ts are copied to Td.

[5] Camera Angle Set Up Routine

Figure 5:
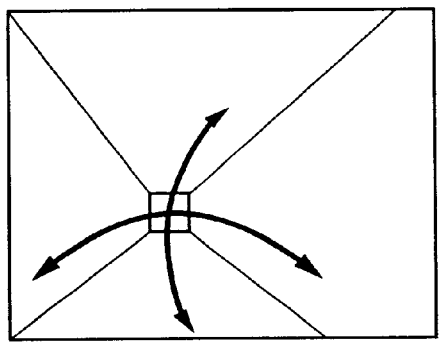
FIGS. 5(*a*) to 5(*d*) are diagrams showing a method of operating a camera angle set up routine of the embodiment 1.
Figure 5:
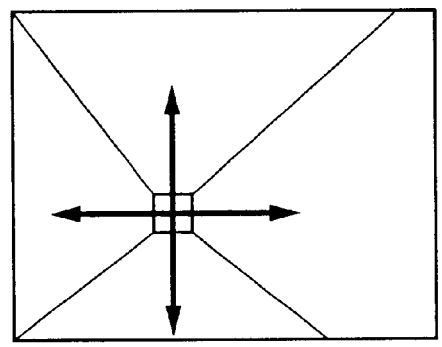
Figure 5:
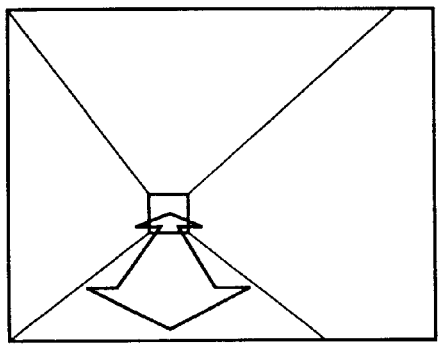
Figure 5:
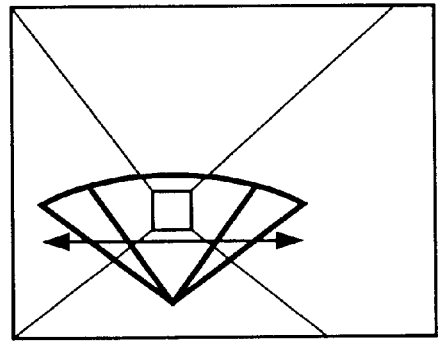

The camera angle set up routine 530 will be described with reference to FIGS. 5(*a*) to 5(*d*). Cd described hereunder is a camera angle which is newly set up. Cd may be a parameter such as three-dimensional coordinates (Cd.Ex, Cd.Ey, Cd.Ez) of a visual point, three-dimensional coordinates (Cd.Lx, Cd.Ly, Cd.Lz) of a point of observation and angles of view (Cd.Ea). There are four modes of setting up the camera angle as shown in FIG. 5(*a*) to FIG. 5(*d*), and respective modes are set up by means of the input device 153 such as a keyboard. Respective modes will be described hereinafter. Horizontal and vertical moving quantities of the pointing device are assumed to be Mx and My.

(1) Up and down and left and right rotation

First, the three-dimensional vectors from the visual point to the point of observation are assumed to be (dx, dy, dz) and is obtained as shown with the following expressions.

$$dx=Cd.Lx-Cd.Ex$$

$$dy=Cd.Ly-Cd.Ey$$

$$dz=Cd.Lz-Cd.Ez$$

Next, r2, r, phi and th are obtained as shown with the following expressions.

$$r2=sqrt(sqr(dx)+sqr(dz))$$

$$r=sqrt(sqr(dx)+sqr(dy)+sqr(dz))$$

$$phi=asin(dy/r)$$

$$th=acos(dz/r2)$$

Here, sqr expresses a square, sqrt expresses a square root, and asin and acos express an arcsine function and an arccosine function, respectively. Next, th and phi are updated as shown with the following expressions.

$$th=th-(Mx*0.01)$$

$$phi=phi-(My*0.01)$$

The three-dimensional vector from the visual point to the point of observation is updated using th and phi as shown with the following expressions.

$$r2=r*cos(phi)$$

$$dz=r2*cos(th)$$

$$dx=r2*sin(th)$$

$$dy=r*sin(phi)$$

The three-dimensional coordinates of the point of observation are obtained from the obtained vector as shown with the following expressions.

$$Cd.Lx=dx+Cd.Ex$$

$$Cd.Ly=dy+Cd.Ey$$

$$Cd.Lz=dz+Cd.Ez$$

It is possible to rotate the camera angle up and down and left and right by horizontal and vertical operations of the pointing device by the user through the processing described above.

(2) Up and down and left and right movement

The camera is moved in up and down directions using My as described hereunder.

$$Cd.Ey=Cd.Ey-My*20.0$$

$$Cd.Ly=Cd.Ly-My*20.0$$

Further, the camera is moved in left and right directions using Mx as described hereunder. A vector meeting at right angles in a horizontal direction with the three-dimensional vector from the visual point to the point of observation is assumed to be (sx, sy, sz), and is obtained as shown with the following expressions.

$$sx=Cd.Lz-Cd.Ez$$

$$sy=0.0$$

$$sz=-(Cd.Lx-Cd.Ex)$$

Further, the scalar of the vector is assumed to be scl, and the vector is normalized.

$$scl=sqrt(sx*sx+sy*sy+sz*sz)$$

$$sx=sx/scl$$

$$sy=sy/scl$$

$$sz=sz/scl$$

The three-dimensional coordinates of the visual point and the point of observation are obtained as described hereunder using the normalized vector.

$$Cd.Ex=Cd.Ex+Mx*20.0*sx$$

$$Cd.Lx=Cd.Lx+Mx*20.0*sx$$

$$Cd.Ey=Cd.Ey+Mx*20.0*sy$$

$$Cd.Ly=Cd.Ly+Mx*20.0*sy$$

$$Cd.Ez=Cd.Ez+Mx*20.0*sz$$

$$Cd.Lz=Cd.Lz+Mx*20.0*sz$$

Through the processing described above, it is possible to move the camera angle up and down and left and right by horizontal and vertical operations of the pointing device by the user.

(3) Movement in front and in the rear

First, the three-dimensional vector from the visual point to the point of observation is assumed to be (dx, dy, dz), and is obtained as shown with the following expressions.

$$dx=Cd.Lx-Cd.Ex$$

$$dy=Cd.Ly-Cd.Ey$$

$$dz=Cd.Lz-Cd.Ez$$

Further, the scalar of the vector is assumed to be scl, the vector is normalized and multiplied by the movement quantity.

$$scl=sqrt(dx*dx+dy*dy+dz*dz)$$

$$dx=dx/sclMy*10.0$$

$$dy=dy/sclMy*10.0$$

$$dz=dz/sclMy*10.0$$

The three-dimensional coordinates of the visual point and the point of observation are obtained as described hereunder using the normalized vector.

$$Cd.Lx=Cd.Lx+dx$$

$$Cd.Ex=Cd.Ex+dx$$

$$Cd.Ly=cd.Ly+dy$$

$$Cd.Ey=Cd.Ey+dy$$

$$Cd.Lz=Cd.Lz+dz$$

$$Cd.Ez=Cd.Ez+dz$$

Through the processing described above, it is possible to move the camera angle in front and in the rear by vertical operation of the pointing device by the user.

(4) Increase and decrease of the angle of field

The angle of field Ea is obtained using Mx as shown with the following expression.

Cd.Ea=Cd.Ea+Mx*0.1

Through the processing described above, it is possible to increase and decrease the angle of field of the camera angle by horizontal operation of the pointing device by the user.

The processings (1) to (4) described above are executed by the operation of the pointing device by the user, and the camera angle is set up and stored in the data table 550.

[6] Conversion Picture Formation Routine

Figure 6:
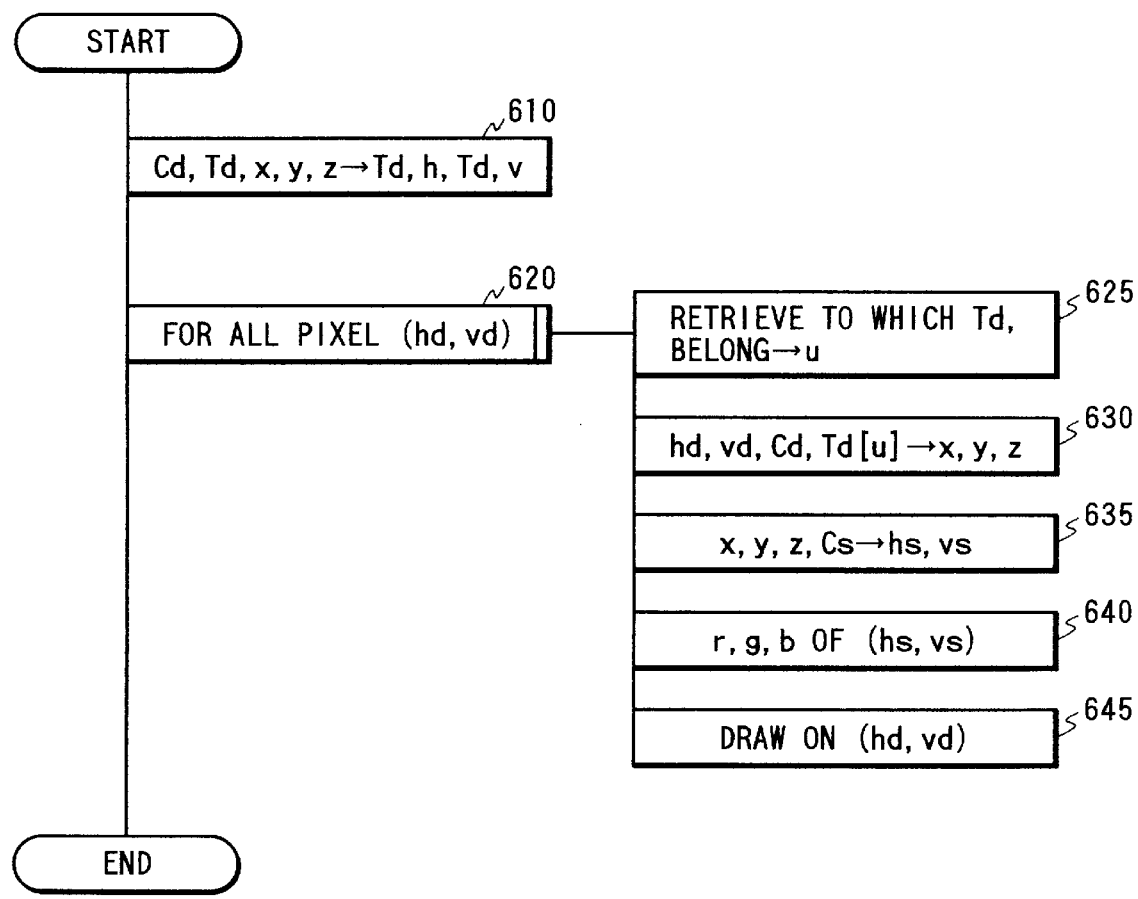
FIG. 6 is a diagram showing a flow of a conversion picture formation routine of the embodiment 1.

The conversion picture formation routine 540 will be described with reference to FIG. 6. In a process 610, two-dimensional coordinates of Td are obtained from the three-dimensional coordinates of respective apexes of respective trapezoids Td and camera angle Cd. In 620, processings from 625 to 645 are performed with respect to all the picture elements hd and vd. In 625, it is retrieved to find which Td hd and vd belong to and the result is substituted for u. In 630, the three-dimensional coordinates (x, y, z) corresponding to hd and vd are obtained from hd, vd, Cd and Td[u]. In 635, two-dimensional coordinates hs and vs are obtained from three-dimensional coordinates (x, y, z) and Cs. In 640, color information (r, g, b) of red, green and blue in the coordinates hs and vs of the original picture are obtained from the data table. In 645, picture elements in colors (r, g, b) are drawn at the coordinates hd and vd.

[7] Data Table

Figures 7A, 7B:
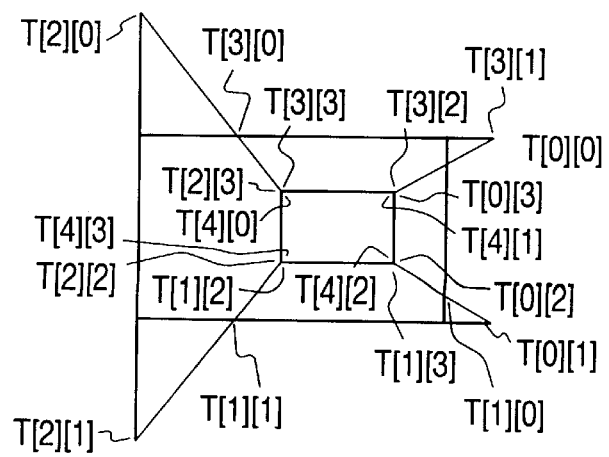
FIGS. 7A and 7B are diagrams showing a data table and coordinates of trapezoids of the embodiment respectively.

The data table 550 will be explained with reference to FIG. 7. The data table is initialized when the picture conversion software 501 is started. This data table is updated by the vanishing point set up routine 510, the three-dimension estimation routine 520 and the camera angle set up routine 530, and is used when a conversion picture is formed in the conversion picture formation routine 540.

710 and 720 show camera angles. Cs denotes an initial camera, and Cd denotes an altered camera angle. Ex, Ey and Ez show three-dimensional coordinates of a visual point, Lx, Ly and Lz show three-dimensional coordinates of a point of observation, and Ea shows the angle of field. Cd is updated in the camera angle set up routine 530. 730 and 740 indicate two-dimensional coordinates (h, v) and three-dimensional coordinates (x, y, z) in the three-dimensional space of respective apexes of respective trapezoids shown in FIG. 7B. 750 indicates a data region where color information of respective picture elements of the original picture is stored. 760 shows two-dimensional coordinates of the vanishing point VP, and 770 shows the rectangular region R of the depth.

Embodiment 2

Another embodiment of the present invention will be explained hereinafter with reference to the drawings.

In the present embodiment, a method of converting only a region to be observed into a picture seen from another visual point after completing the to processings of the vanishing point set up routine 510 and the three-dimension estimation routine 520 of the embodiment 1 will be described.

Figure 8A:
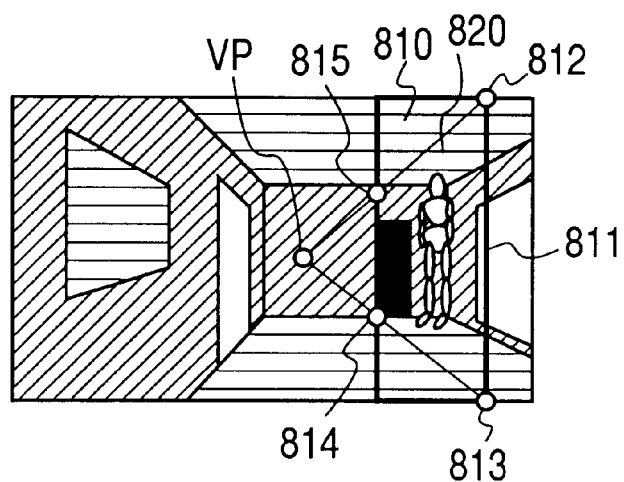
FIGS. 8A to 8C are diagrams showing a method of operating an embodiment 2.

FIG. 8A shows a set up picture of a region to be observed. The region to be observed is set up with a rectangle 810 by means of the pointing device. At this time, the vanishing point VP should not be included in the rectangular region. When the rectangular region is set up, it is assumed that a trapezoid composed of both ends 812 and 813 of a side 811 farther from the vanishing point and intersecting points 815 and 814 between segments connecting 812 with the vanishing point and 813 with the vanishing point and the side opposing to 811 is a region to be observed 820. The region to be observed 820 is a rectangular plane in the three-dimensional space.

Figure 8B:
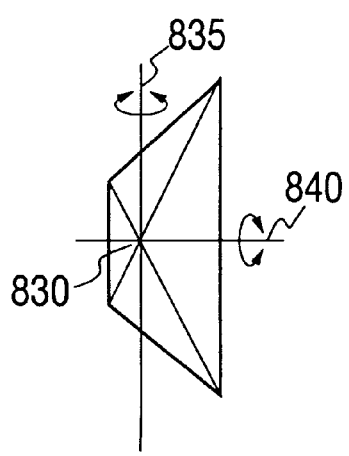

FIG. 8B shows rotation of the region to be observed 820. The three-dimensional coordinates of respective apexes of the region to be observed 820 are computed and the center (830) is obtained. Next, the region to be observed is rotated in horizontal (840) and vertical (835) axial directions with respect to the region to be observed by the horizontal and vertical operations of the pointing device.

Figure 8C:
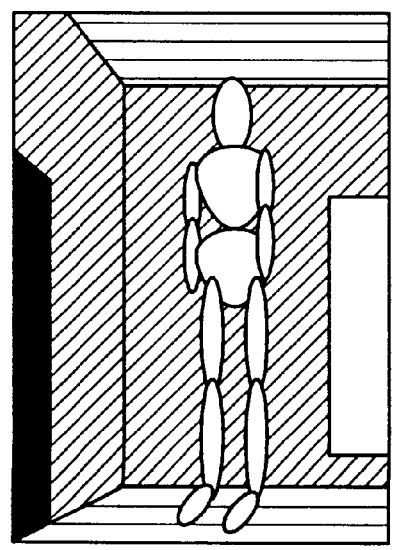

Through the operation described above, it is possible to obtain a picture seen from another angle such as shown in FIG. 8C by a technique similar to the conversion picture formation routine of the embodiment 1.

Embodiment 3

Another embodiment of the present invention will be explained hereinafter with reference to the drawings.

In the present embodiment, a method of forming a texture picture used in a texture mapping method in three-dimensional computer graphics after the processing of the vanishing point set up routine 510 of the embodiment 1 is completed will be described.

Figure 9A:
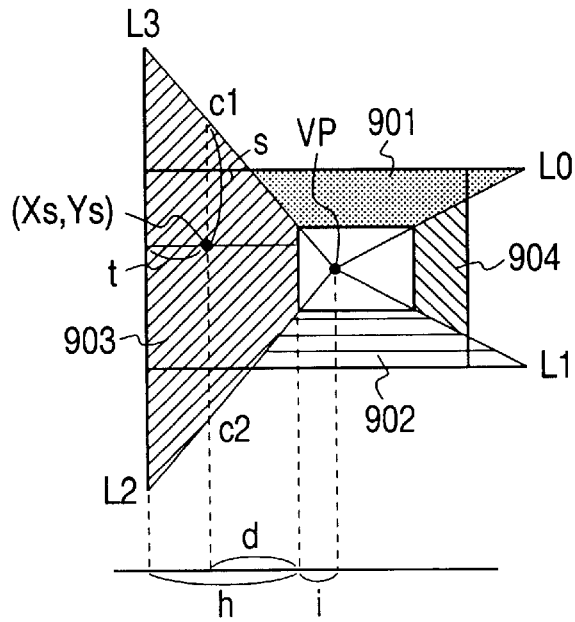
FIGS. 9A to 9C are diagrams showing an embodiment 3.

901, 902, 903 and 904 shown in FIG. 9A show four trapezoids having respective sides top and bottom and left and right of the rectangular region R shown in FIG. 3 and respective sides top and bottom and left and right of the original picture as opposing sides. The processing described hereunder shown in FIG. 9C is performed for respective trapezoids.

Figure 9B:
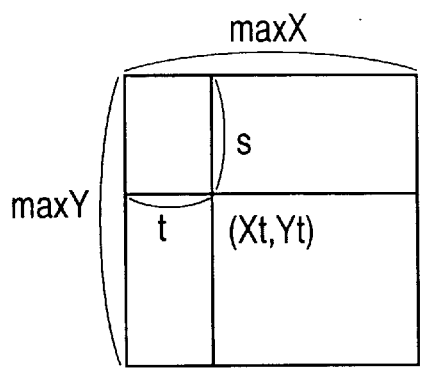

First, numbers of horizontal and vertical picture elements (maxX, maxY) of the texture picture to be formed are set up. It is assumed that the values obtained by dividing coordinates Xt and Yt of respective picture elements by maxX and maxY are t and s (FIG. 9B), and the following processing is performed with respect to respective picture elements of all of the texture pictures.

Figure 9C:
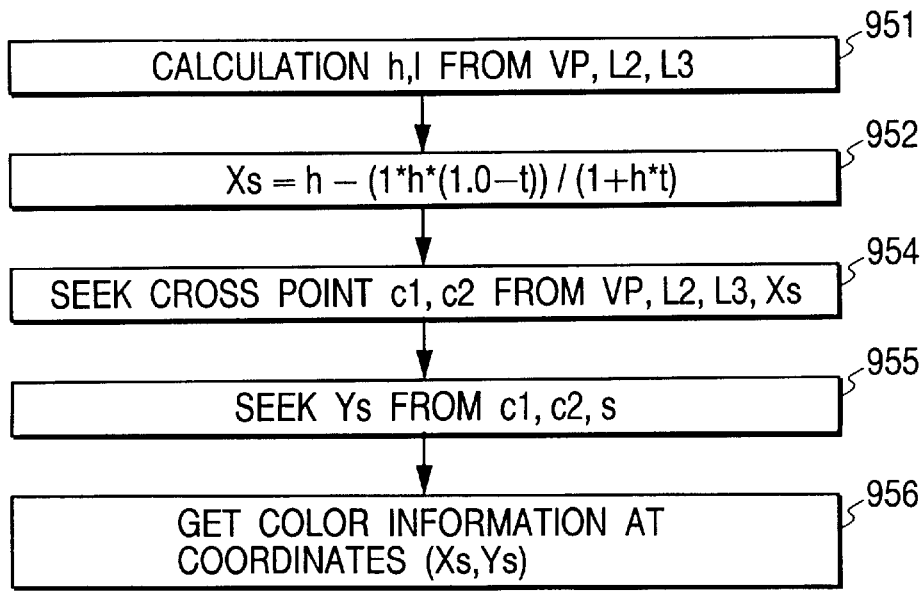
Figure 10:
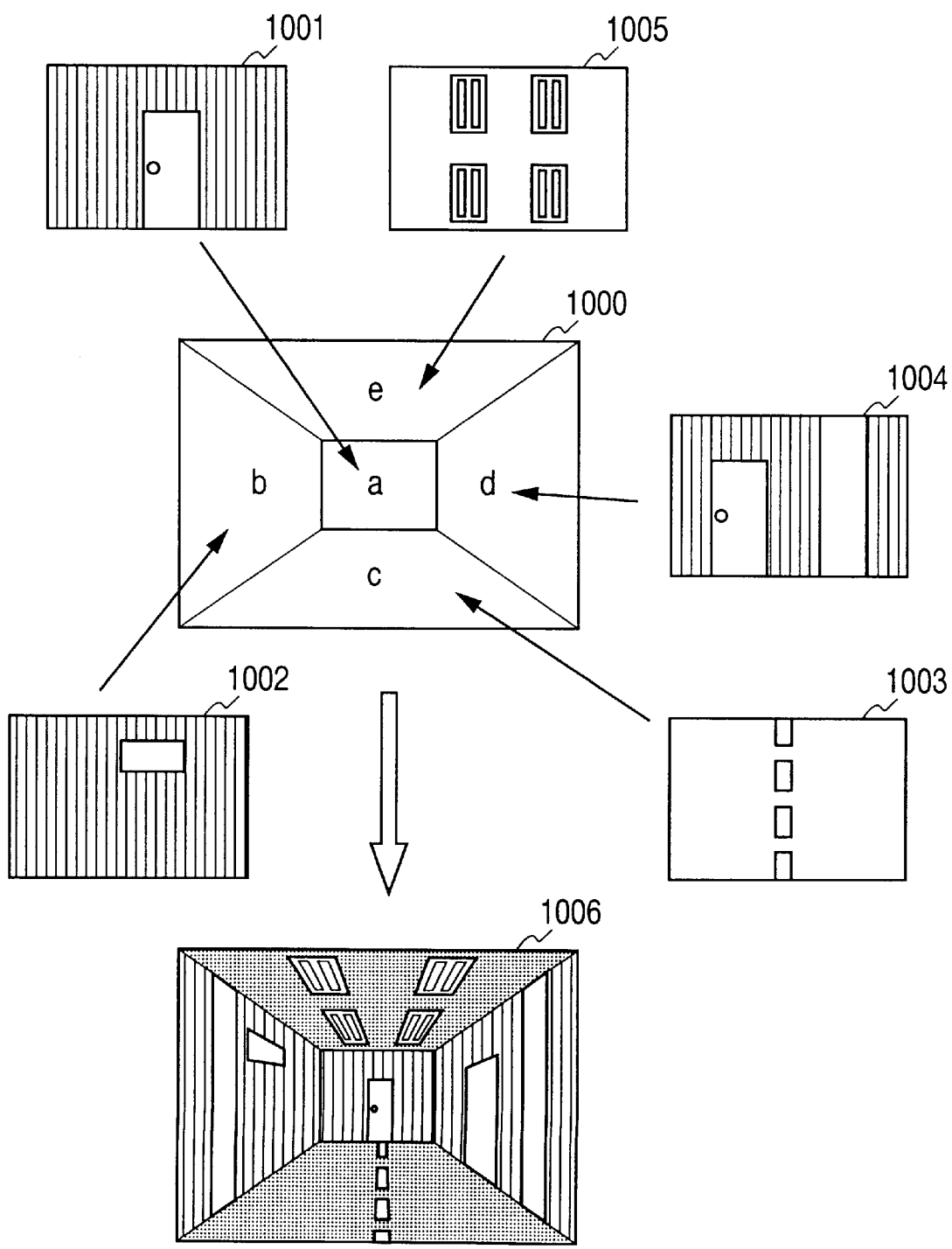
FIG. 10 is an explanatory diagram of a conventional example.

In 951 shown in FIG. 9C, h and l are obtained from the rectangular region R, the vanishing point VP and apexes L2 and L3 of the trapezoid. In 952, Xs is obtained using h, l and t as shown with the following expression.

Xs=h−(l*h*(1.0−t))/(l+h*t)

In 954, intersecting points c1 and c2 are obtained from VP, L2, L3 and Xs. In 955, the coordinates Ys of the original picture is obtained using c1, c2 and s. In 956, color information of the coordinates Xt and Yt of the texture is obtainable from color information in the coordinates Xs and Ys of the original picture.

Through the processing described above, five pieces of texture pictures corresponding to respective trapezoids are obtainable.

The invention has been described with reference to the preferred and alternate embodiments. Obviously, modifications and alternations will occur to those of ordinarily skill in the art upon reading and understanding the present invention. It is intended that the invention be construed as including all such modifications and alternations in so far they come with the scope of the appended claims or the equivalent thereof.

What is claimed is:

1. A method of forming a three-dimensional picture comprising the steps of:

displaying a picture expressed by two-dimensional picture data on a picture plane;

arranging an auxiliary figure composed of a rectangular region and radial segments of lines at the center of said displayed picture;

moving and deforming the position and the configuration of said auxiliary figure, thereby to have said rectangular region coincide with a dead end region of the depth of said displayed picture;

setting up a boundary line of respective structural planes forming the three-dimensional space by means of said radial segments of lines; and forming three-dimensional picture data of said displayed picture based on said respective structural planes.

2. A method of forming a three-dimensional picture comprising the steps of:

displaying a picture expressed by two-dimensional picture data on a picture plane;

arranging an auxiliary figure composed of a rectangular region and radial segments of lines at the center of said displayed picture;

moving and deforming the position and the configuration of said auxiliary figure, thereby to have said rectangular region coincide with a dead end region of the depth of said displayed picture;

setting up a boundary line of respective structural planes forming the three-dimensional space by means of said radial segments of lines;

forming three-dimensional picture data of said displayed picture based on said respective structural planes;

setting up a camera angle different from that for said displayed picture; and converting said displayed picture into a picture seen in the direction of said vanishing point from said camera angle and redisplaying the picture on a picture plane.

3. A storage medium for storing a control program read out to an information processing unit and executed therein which is a control program for converting a two-dimensional picture displayed on a display picture plane into a three-dimensional picture, comprising the control program composed of:

processing of displaying a two-dimensional picture on a display picture plane;

processing of displaying an auxiliary figure. composed of a rectangle and radial segments of lines while placing the auxiliary figure upon said two-dimensional picture;

processing of deforming said auxiliary figure and setting up structural planes when said two-dimensional picture is converted into a three-dimensional picture;

processing of forming data of a three-dimensional image from coordinates data of said two-dimensional picture based on the positions of said structural planes; and processing of displaying a three-dimensional picture on a display picture plane with said formed data.

4. A method of converting a picture for converting two-dimensional picture data into three-dimensional picture data, comprising the steps of:

preparing two-dimensional picture data;

displaying a two-dimensional picture expressed by said two-dimensional picture data and an auxiliary figure composed of a rectangle and radial segments of lines;

positioning the sides of said rectangle and said radial segments of lines to optional positions of said two-dimensional picture;

obtaining the vanishing point of said two-dimensional picture from the arrangement position of said auxiliary figure;

setting up a first camera angle after converting said two-dimensional picture into a three-dimensional picture; and converting said two-dimensional picture into a three-dimensional picture seen in the direction of said vanishing point at a second camera angle being different from said first camera angle and displaying the three-dimensional picture.

5. A method of converting a picture for converting two-dimensional picture data into three-dimensional picture data, comprising the steps of:

preparing two-dimensional picture data;

displaying a two-dimensional picture expressed by said two-dimensional picture data and an auxiliary figure having radial segments of lines toward the vanishing point from the points obtained by equally dividing respective top and bottom and left and right sides of said two-dimensional picture;

moving the vanishing point by setting said segments of a line to a boundary between plates expressed with said two-dimensional picture;

setting up a camera angle which corresponds to a camera angle to obtain a converted three-dimensional picture;

converting said two-dimensional picture into a three-dimensional picture seen in the direction of said vanishing point at said camera angle and displaying the three-dimensional picture.

6. A method of converting a picture for converting two-dimensional picture data into three-dimensional picture data, comprising the steps of:

preparing two-dimensional picture data;

displaying a two-dimensional picture expressed by said two-dimensional picture data, and an auxiliary figure having segments of lines from the points obtained by equally dividing respective top and bottom and left and right sides of said two-dimensional picture toward the vanishing point and a polygonal region expressing the dead end of the depth;

moving the vanishing point while setting said segments of a line to a boundary between planes expressed with said two-dimensional picture;

deforming and moving said polygonal region to the region of the depth expressed by said two-dimensional picture;

setting up a camera angle which corresponds to a camera angle to obtain a converted three-dimensional picture;

converting said two-dimensional picture into a picture seen from said camera angle in the direction of said vanishing point in said moved and set up polygonal region and displaying the picture.

7. A method of converting a picture for converting two-dimensional picture data into three-dimensional picture data, comprising the steps of:

preparing two-dimensional picture data;

displaying a two-dimensional picture expressed by said two-dimensional picture data and a first auxiliary figure composed of a rectangle and radial segments of lines;

performing movement and deformation so that the sides of said rectangle are set so as to coincide with the depth portion of said two-dimensional picture, and computing the vanishing point of said two-dimensional picture from said first auxiliary figure by setting said segments of lines to a boundary between other planes of the depth plane of said two-dimensional picture;

operating configuration data of a three-dimensional picture of said two-dimensional picture from the configuration of said first auxiliary figure, and displaying a three-dimensional picture based on said configuration data;

displaying a second auxiliary figure in which said three-dimensional configuration is projected on two-dimensions from an initialized camera angle;

operating said second auxiliary figure thereby to newly set up a camera angle; and converting said two-dimensional picture into a picture seen from said camera angle from said three-dimensional configuration.

8. A method of forming a three-dimensional picture, comprising the steps of:

displaying a picture expressed by two-dimensional picture data on a picture plane;

arranging an auxiliary figure composed of a rectangular region and radial segments of lines at the center of said displayed picture;

moving and deforming the position and the configuration of said auxiliary figure so as to have said rectangular region coincide with the dead end region of the depth of said displayed picture;

setting up boundary lines of respective structural planes forming a three-dimensional space by means of said radial segments of lines;

forming three-dimensional data of said displayed picture based on said respective structural planes;

setting up an optional visual point position in said three-dimensional space; and converting said displayed picture into a picture seen in the direction of said vanishing point from said visual point position and redisplaying the picture on a picture plane.

* * * * *